(12) United States Patent
Morita (10) Patent No.: US 6,445,674 B1
(45) Date of Patent: Sep. 3, 2002

(54) OPTICAL HEAD APPARATUS AND OPTICAL DISK APPARATUS

(75) Inventor: Masayoshi Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/410,080

(22) Filed: Oct. 1, 1999

(30) Foreign Application Priority Data

Oct. 5, 1998 (JP) ............................................. 10-283141

(51) Int. Cl.⁷ ............................... G11B 7/12; G11B 3/58
(52) U.S. Cl. ...................... 369/244; 369/219; 369/244; 369/71
(58) Field of Search ................................ 369/244, 215, 369/219, 249, 71

(56) References Cited

U.S. PATENT DOCUMENTS 5,995,467 A * 11/1999 Ohyama et al. .............. 369/71
6,185,180 B1 * 2/2001 Morishita ................... 369/244

FOREIGN PATENT DOCUMENTS

| JP | 62-46444 | * | 2/1987 |
|---|---|---|---|
| JP | 63-146235 | * | 6/1988 |
| JP | 1-013235 | * | 1/1989 |
| JP | 1-176337 | * | 7/1989 |
| JP | 4-330693 | * | 11/1992 |
| JP | 5-120711 | * | 5/1993 |
| JP | 5-144058 | * | 6/1993 |
| JP | 6-131682 | * | 5/1994 |
| JP | 6-274915 | * | 9/1994 |
| JP | 7-235074 | * | 9/1995 |
| JP | 10-40562 | * | 2/1998 |
| JP | 10-49895 | * | 2/1998 |
| JP | 10-143899 | * | 5/1998 |

* cited by examiner

Primary Examiner—William Klimowicz
(74) Attorney, Agent, or Firm—Jay H. Maioli (57) ABSTRACT

An optical head device which contains a biaxial actuator having an objective lens opposing a signal recording surface of an optical disk; a slide base on which mounted is the biaxial actuator for movement in a radius direction of the optical disk; and a shutter for opening and closing an emission surface of a laser beam transmitted through the objective lens. The shutter is attached to the slide base so as to be movable, and is provided with a trigger portion operated by a chassis movably supporting the slide base to perform the opening and closing operations.

9 Claims, 10 Drawing Sheets

OPTICAL HEAD APPARATUS AND OPTICAL DISK APPARATUS

BACKGROUND OF THE INVENTION

1. Field of the Invention

The present invention relates to an optical head apparatus which records (writes) and/or reproduces (reads) an information signal with respect to an optical recording medium, that is, an optical disk, and to an optical disk apparatus in which the optical head apparatus is used, and in particular, to technology of protecting these apparatuses from a dust or the like.

2. Description of the Related Art

In general, an optical disk (including a magnet-optical disk) has been conventionally proposed as an optical recording medium. Moreover, an optical pickup apparatus has been proposed as an optical head apparatus for reading and writing an information signal with respect to the optical disk.

In an optical disk apparatus which is provided with the aforesaid optical pickup apparatus, the optical disk is supported by a turn table at the central portion thereof, and is rotatably driven by means of a spindle motor having a rotary shaft onto which the turn table is fixed. An objective lens of the optical pickup apparatus is located so as to oppose an information recording surface of the rotatably driven optical disk, and the optical pickup apparatus is movable in a radius direction of the optical disk along the information recording surface thereof.

The optical pickup apparatus is composed of a light source for emitting a laser light or beam, optical components such as a mirror, an objective lens and the like for converging a laser beam emitted from the light source, a photodetector for receiving a reflected laser beam and so on. The laser beam emitted from the light source is converged by the objective lens so as to be irradiated onto the information recording surface. Then, the laser beam reflected on the information recording surface and returned transmits through the objective lens, and is received by the photodetector, and thereby, an information signal recorded on the information recording surface is read out.

By the way, in the optical disk apparatus using the aforesaid optical pickup apparatus, a dust or the like coming into the optical disk apparatus adheres to optical components such as the objective lens or the like of the optical pickup apparatus; and for this reason, there is the possibility that optical characteristic of these optical components are deteriorated by the dust. As described above, when the dust or the like adheres to optical components such as the objective lens or the like, it is difficult to record or reproduce an information signal of the optical disk. For this reason, an error is caused in writing and reading of a required information signal; as a result, there is the possibility that the optical disk apparatus malfunctions.

In order to prevent the aforesaid malfunction, for example, the following preventive measure is considered; more specifically, the optical disk apparatus is constructed into a hermetically sealed state in a manner that dust or the like does not come into the optical disk apparatus from the outside, and thus, the dust or the like does not adhere to the optical pickup apparatus, or is hard to adhere thereto. However, it is necessary to radiate a heat of electronic components built in the optical disk apparatus, so that it is difficult to hermetically seal the optical disk apparatus. Therefore, the aforesaid measure is not a suitable countermeasure.

Moreover, there is a consideration of covering the optical components with a cover in no use of the optical pickup apparatus. An optical pickup apparatus having the cover as described above has been proposed in U.S. Pat. No. 5,995,467 and Japanese Unexamined Patent Application Publication (Kokai) No. 10-143899 filed by the applicant of this application. The above U.S. Pat. No. 5,995,467 discloses an optical disk apparatus which prevents a lens of the optical pickup apparatus from dirtying. The optical disk apparatus is provided with a shutter which is driven by means of a shutter driving means so as to be movable between a close position for hiding the objective lens and an open position for exposing the objective lens. The shutter is movable to the close position or the open position in accordance with a stop or drive operation of a mechanical chassis. Further, the above Publication (Kokai) No. 10-143899 discloses an optical pickup apparatus which prevents dust from adhering to the objective lens in no use of the optical pickup apparatus. This optical pickup apparatus has a hole through which a luminous flux emitted from the objective lens passes, and a shutter plate which is rotatably attached-to a cover for covering an actuator. When the optical pickup apparatus is moved outside a read area, the shutter plate is rotated so as to close the hole.

However, the aforesaid conventional optical disk apparatus and the optical pickup apparatus are both constructed in a manner that the shutter is rotatably attached to the cover for covering the optical pickup apparatus, and a plate thickness of the cover is thin, so that the strength thereof is relatively low. As a result, there is a problem that not only the strength of portion for supporting the shutter is low, but also there is not sufficient in a degree of freedom for constructing a mechanism of opening and closing the shutter.

SUMMARY OF THE INVENTION

The present invention has been made taking the aforesaid problem in the prior art into consideration. Therefore, an object of the present invention is to solve the above problem by providing a construction of movably attaching a shutter for opening and closing an emission surface of objective lens to a slide base on which mounted is a biaxial actuator.

To achieve the above object, the present invention provides an optical head apparatus which can securely support a shutter by movably attaching the shutter to a slide base, and can protect an objective lens from a dust by covering an emission surface of the objective lens with the shutter.

Further, to achieve the above object, the present invention provides an optical disk apparatus which comprises a spindle motor, a slide base, a biaxial actuator, a shutter and a chassis, and can securely support the shutter so as to protect an objective lens from dust or the like by covering an emission surface of the objective lens with the shutter.

BRIEF DESCRIPTION OF THE DRAWINGS

FIG. 9 shows a shutter of the optical disk apparatus according to the present invention, in which FIG. 9B is a front view of the shutter, 9C is a cross sectional view cut along a line X—X of FIG. 9A.

FIG. 10 shows the shutter of the optical disk apparatus according to the present invention, in which

DETAILED DESCRIPTION OF THE PREFERRED EMBODIMENT

Preferred embodiments of the present invention will be described below with reference to the accompanying drawings. FIG. 1 to FIG. 11 show a first embodiment of the present invention, and more specifically, show an optical pickup apparatus used as an optical head apparatus which reproduces (reads) an information signal with the use of an optical disk which is an optical recording medium, and a disk reproducing apparatus used as an optical disk apparatus using the optical pickup apparatus.

Figure 1:
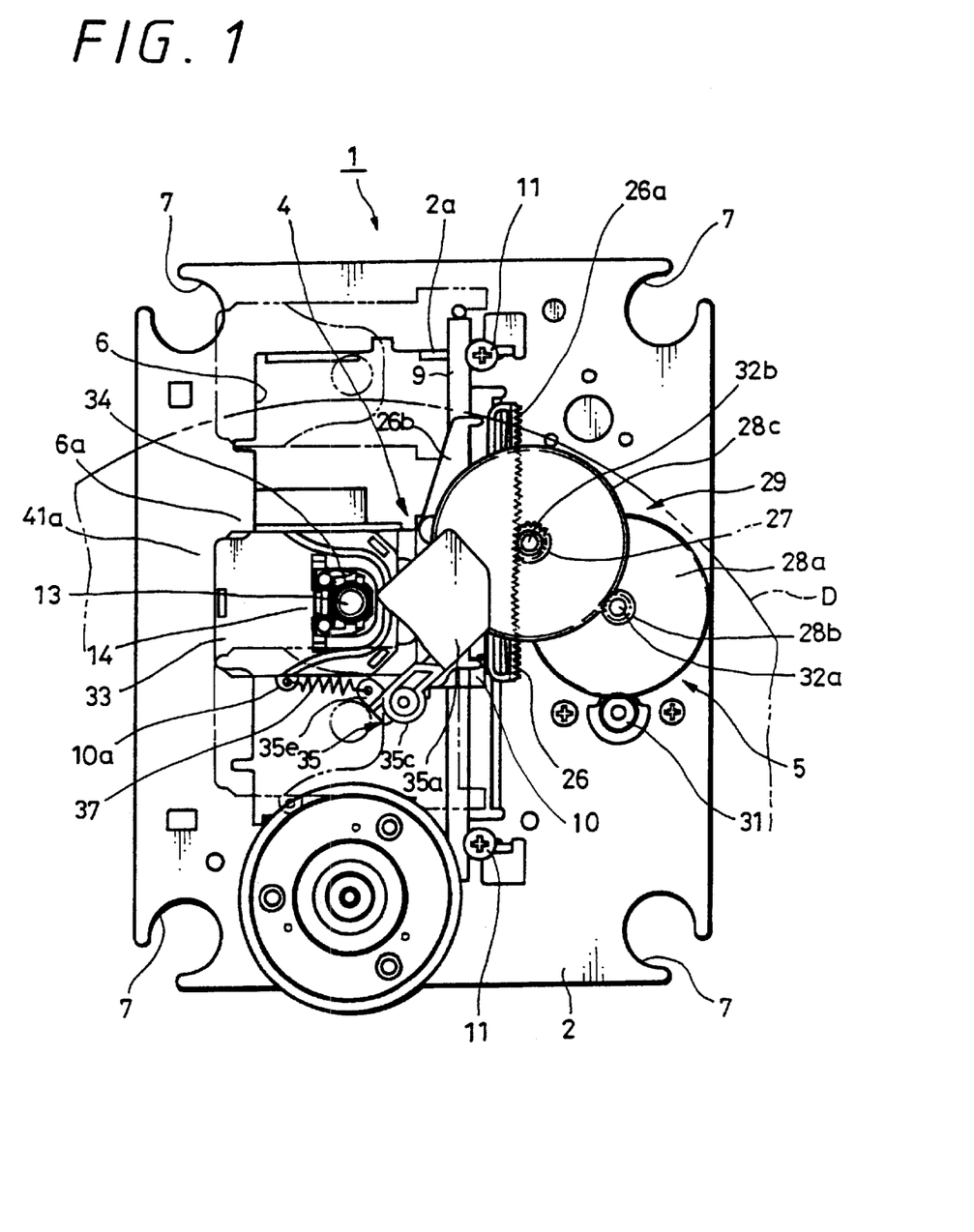
FIG. 1 shows a first embodiment of the present invention, and is a top plan view showing an optical disk apparatus using an optical head apparatus.
Figure 2:
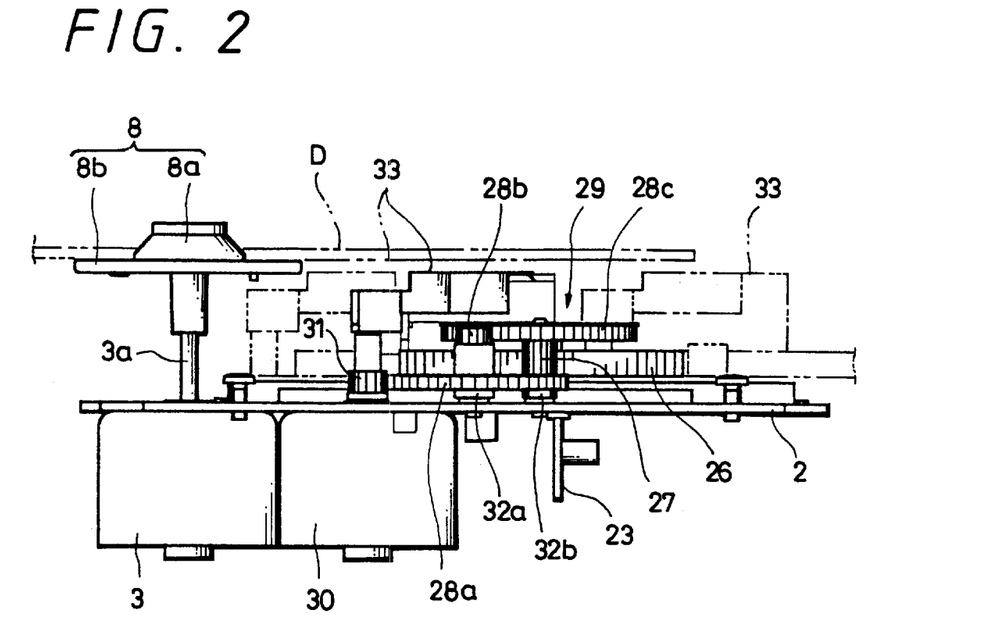
FIG. 2 shows a first embodiment of the present invention, and is a front plan view showing an optical disk apparatus using an optical head apparatus.
Figure 3:
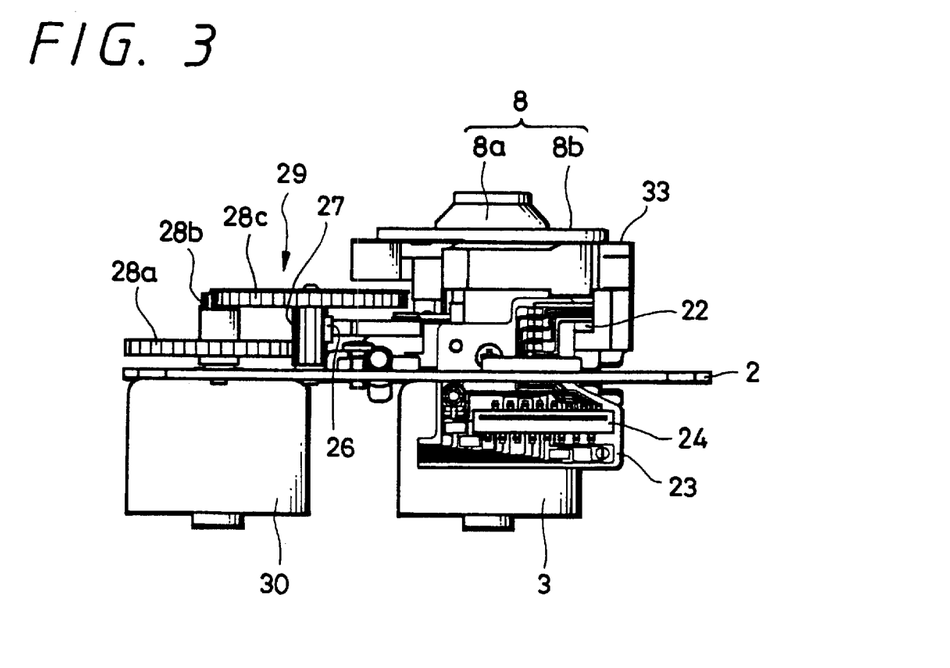
FIG. 3 shows the first embodiment of the present invention, and is a side view showing the optical disk apparatus using an optical head apparatus.
Figure 4:
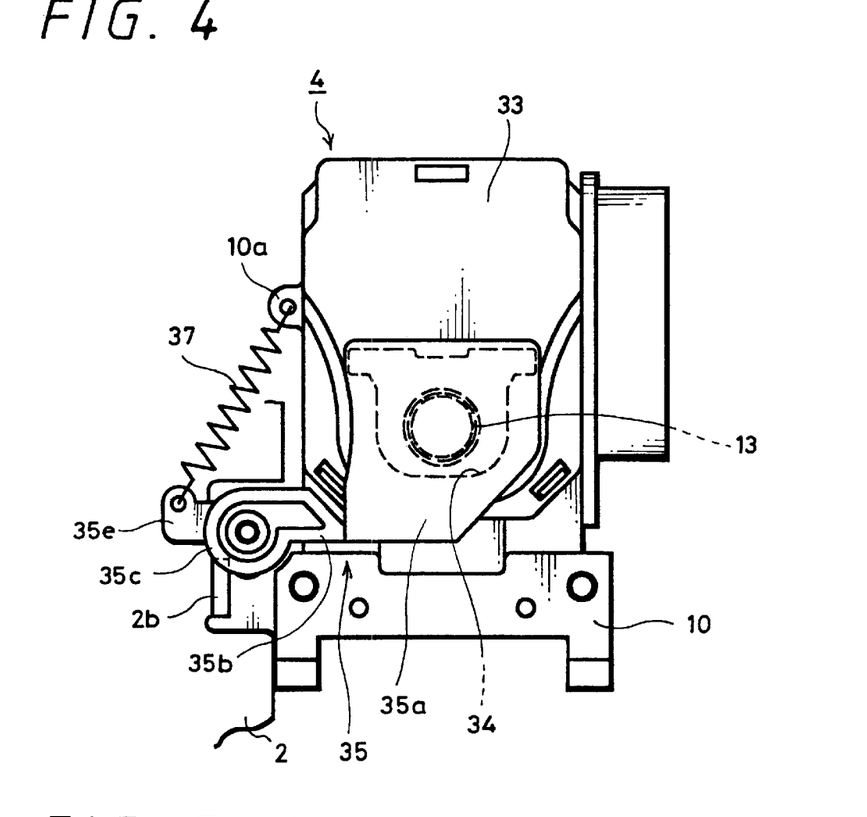
FIG. 4 shows principal parts of the optical disk apparatus according to the first embodiment of the present invention, and is a top plan view showing a state that the cover through-hole is closed by a shutter.
Figure 5:
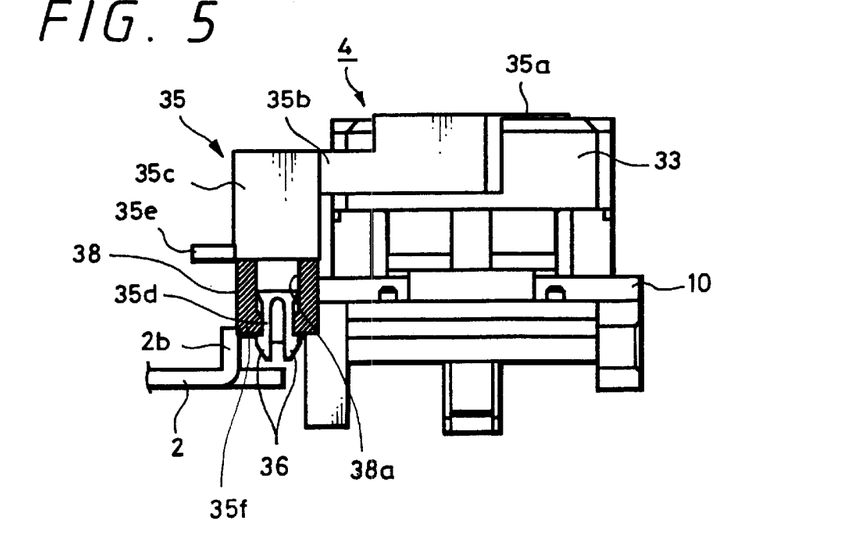
FIG. 5 shows principal parts of the optical disk apparatus according to the first embodiment of the present invention, and is a front view showing a state that the cover through-hole is closed by the shutter.
Figure 6:
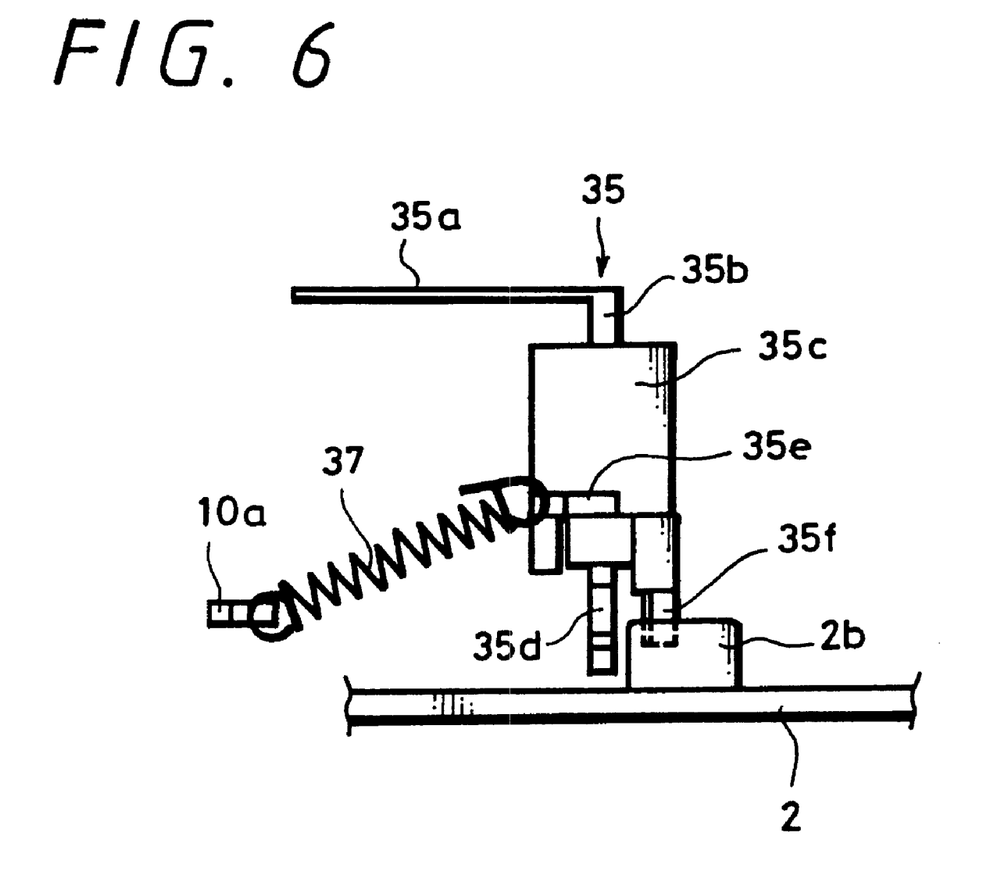
FIG. 6 shows principal parts of the optical disk apparatus according to the first embodiment of the present invention, and is a side view showing a state that the cover through-hole is closed by the shutter.
Figure 7:
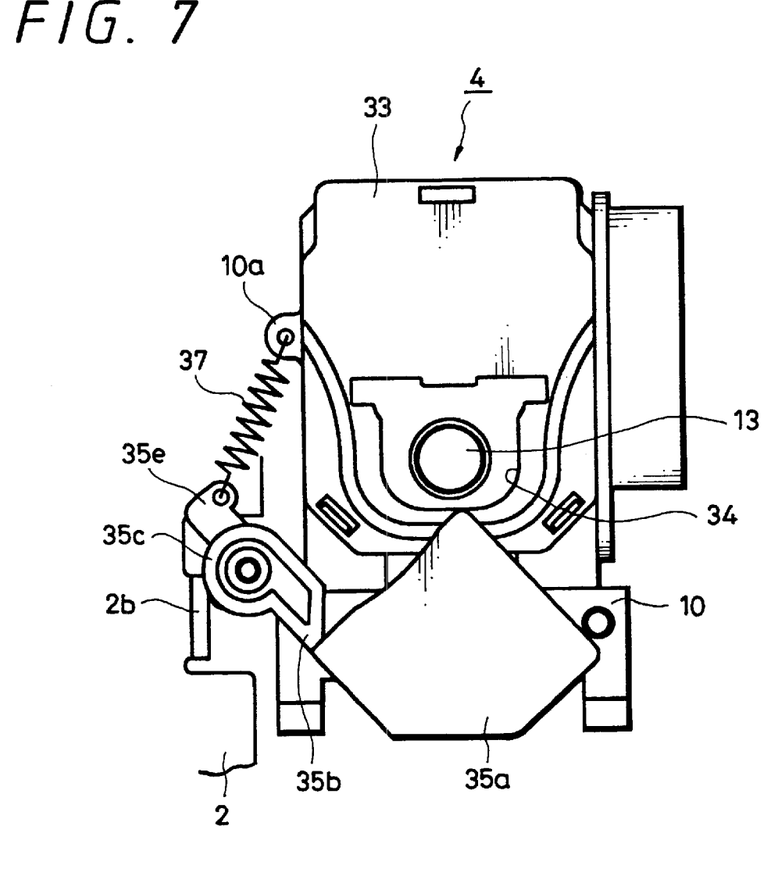
FIG. 7 shows principal parts of the optical disk apparatus according to the first embodiment of the present invention, and is a top plan view showing a state that the shutter is opened so as to expose the cover through-hole.
Figure 8:
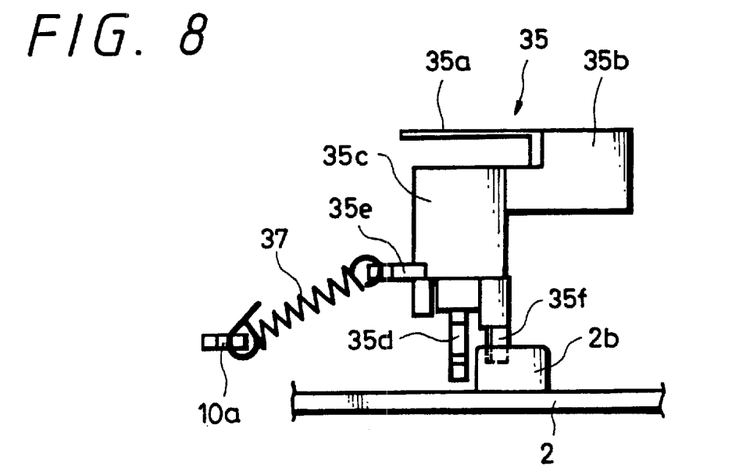
FIG. 8 shows principal parts of the optical disk apparatus according to the first embodiment of the present invention, and is a side view showing a state that the shutter is opened so as to expose the cover through-hole.
Figure 9A:
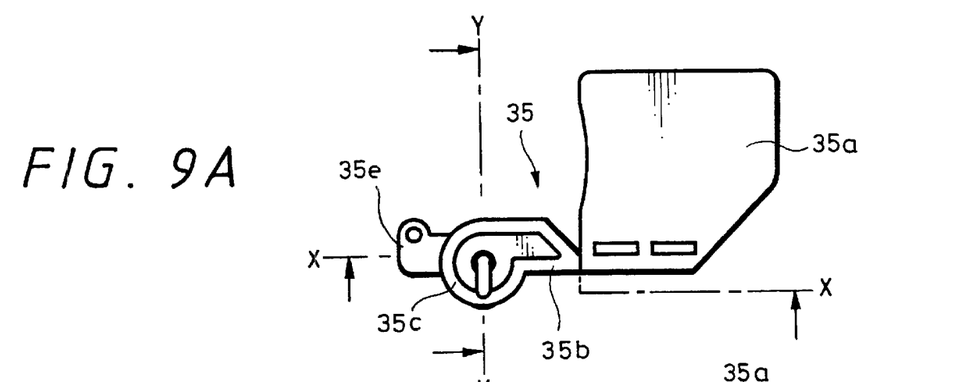
FIG. 9A is a top plan view of the shutter.
Figures 9B, 9C:
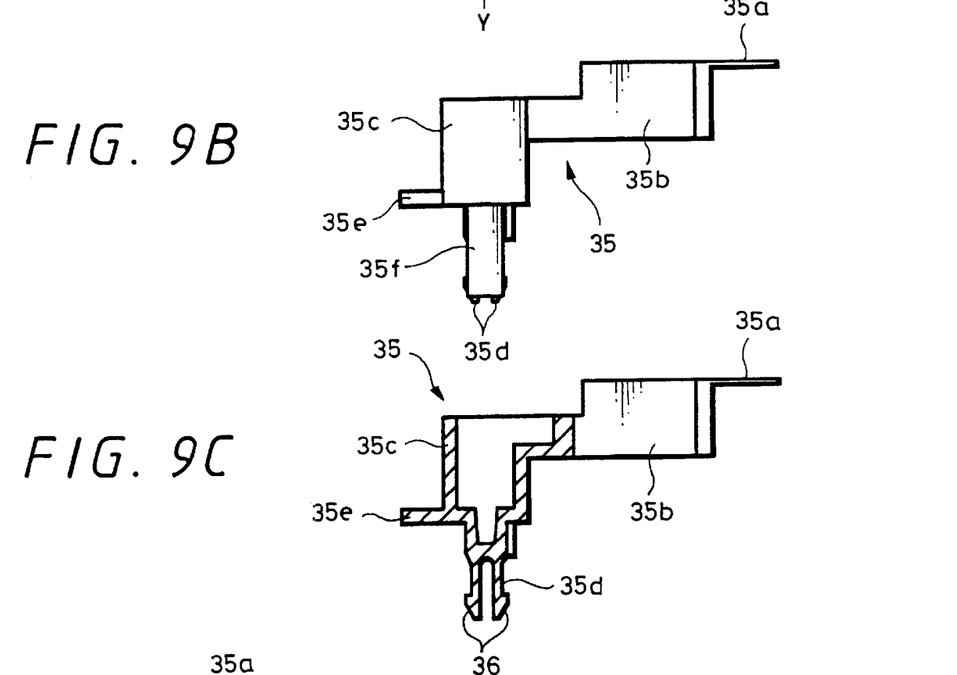
Figure 9D:
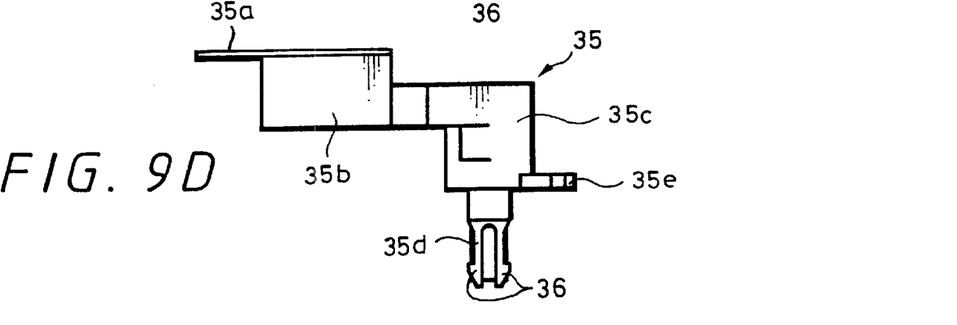
FIG. 9D is a rear view of the shutter.
Figure 10A:
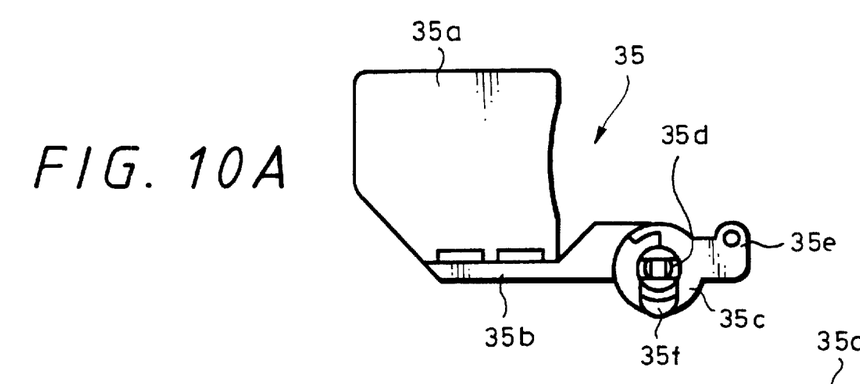
FIG. 10A is a bottom plan view of the shutter.
Figure 10B:
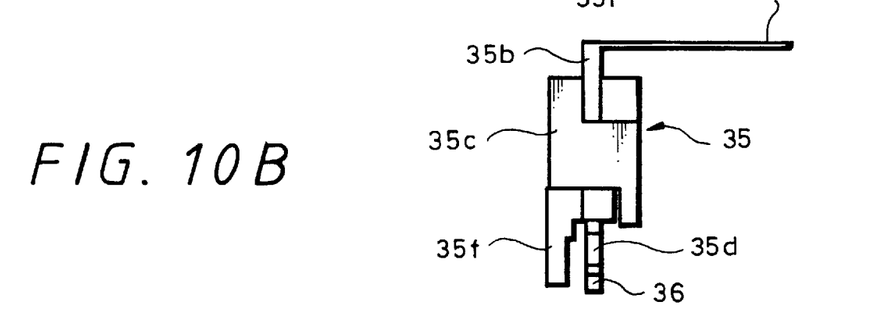
FIG. 10B is a right side view of the shutter, 10C is a left side view of the shutter.
Figure 10C:
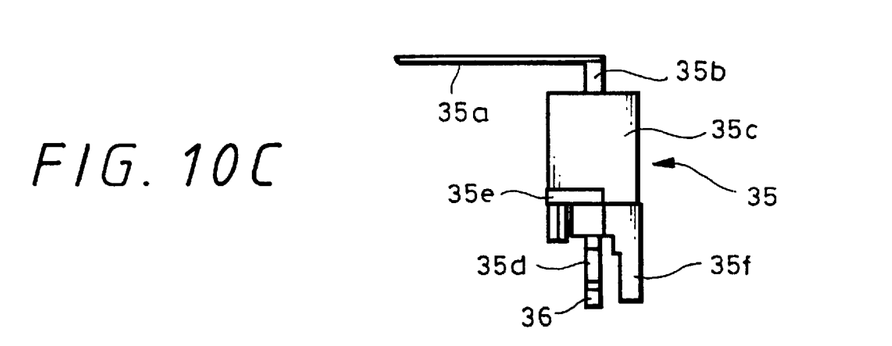
Figure 10D:
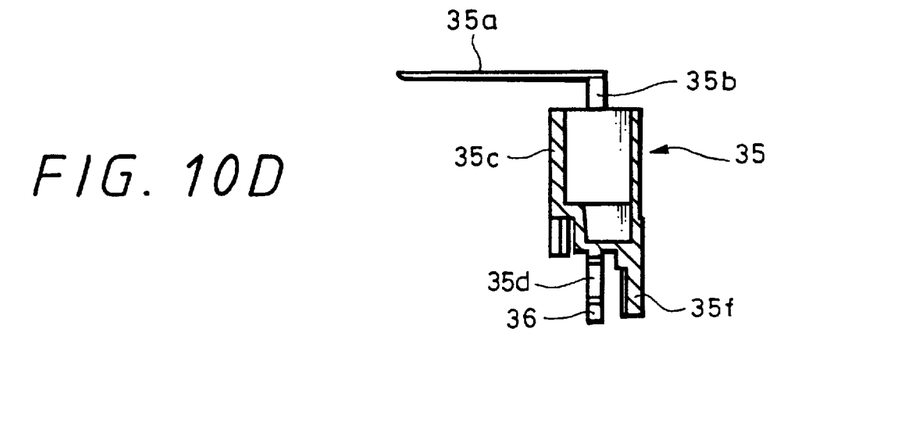
FIG. 10D is a cross sectional view cut along a line Y—Y of FIG. 9A.
Figure 11:
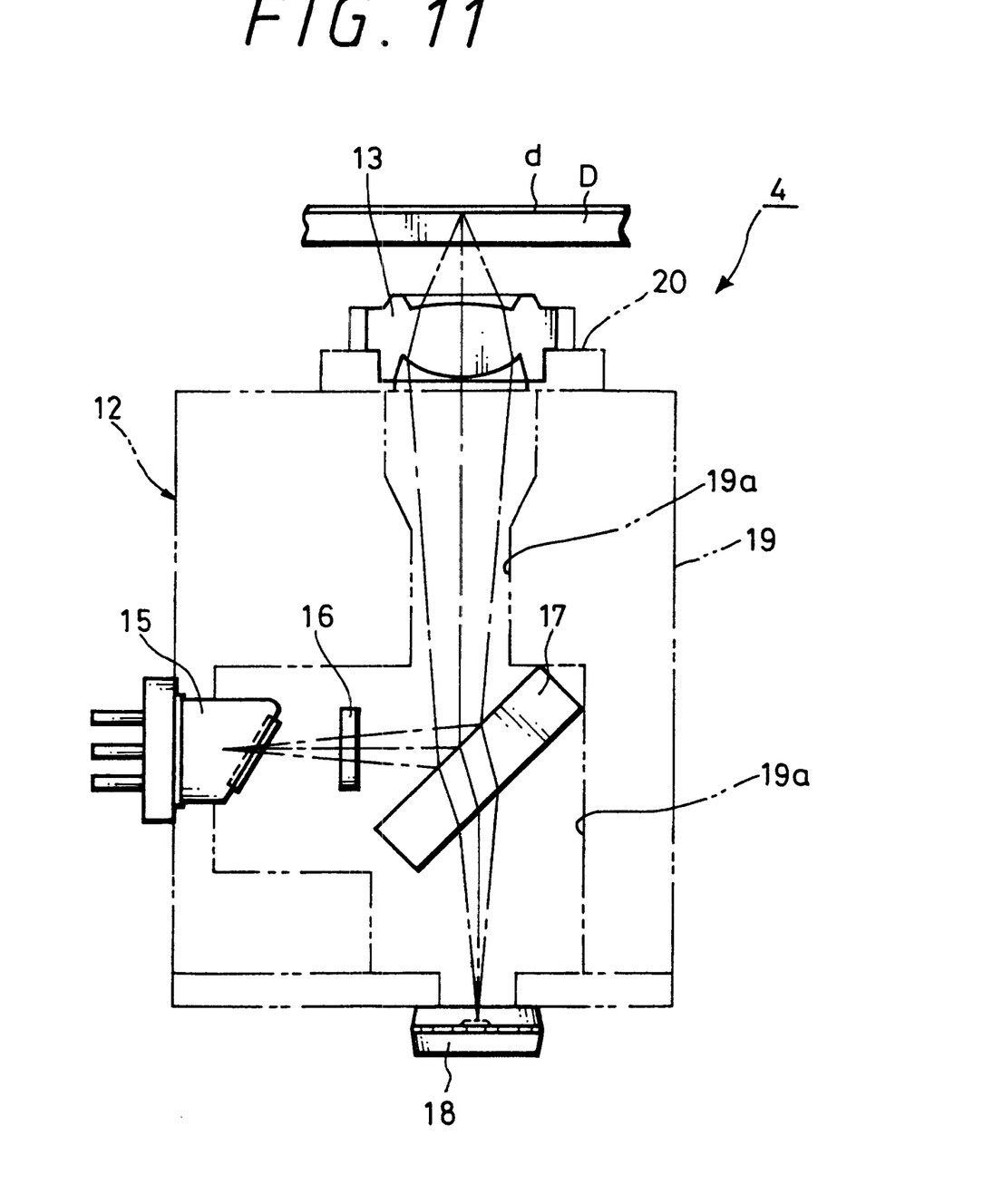
FIG. 11 is a view used to schematically explain a construction of an optical head apparatus of the optical disk apparatus according to the present invention.

More specifically, FIG. 1 to FIG. 3 show an optical disk apparatus according to a first embodiment of the present invention in which FIG. 1 is a top plan view of the optical disk apparatus, FIG. 2 is a front view of the optical disk apparatus, and FIG. 3 is a side view of the optical disk apparatus. FIG. 4 to FIG. 8 are enlarged views of principal parts of the optical disk apparatus shown in FIG. 1 in which FIG. 4 is a top plan view showing a state that a cover through-hole is closed by a shutter, FIG. 5 is a front view showing a state that the cover through-hole is closed by a shutter, FIG. 6 is a side view showing the state that the cover through-hole is closed by a shutter, FIG. 7 is a top plan view showing a state that the cover through-hole is opened, and FIG. 8 is a side view showing a state that the cover through-hole is opened. FIG. 9A to FIG. 9D and FIG. 10A to FIG. 10D individually show a shutter of the optical disk apparatus shown in FIG. 1. Further, FIG. 11 is a view to schematically show a construction of an optical pickup apparatus of the optical disk apparatus shown in FIG. 1.

Figure 12:
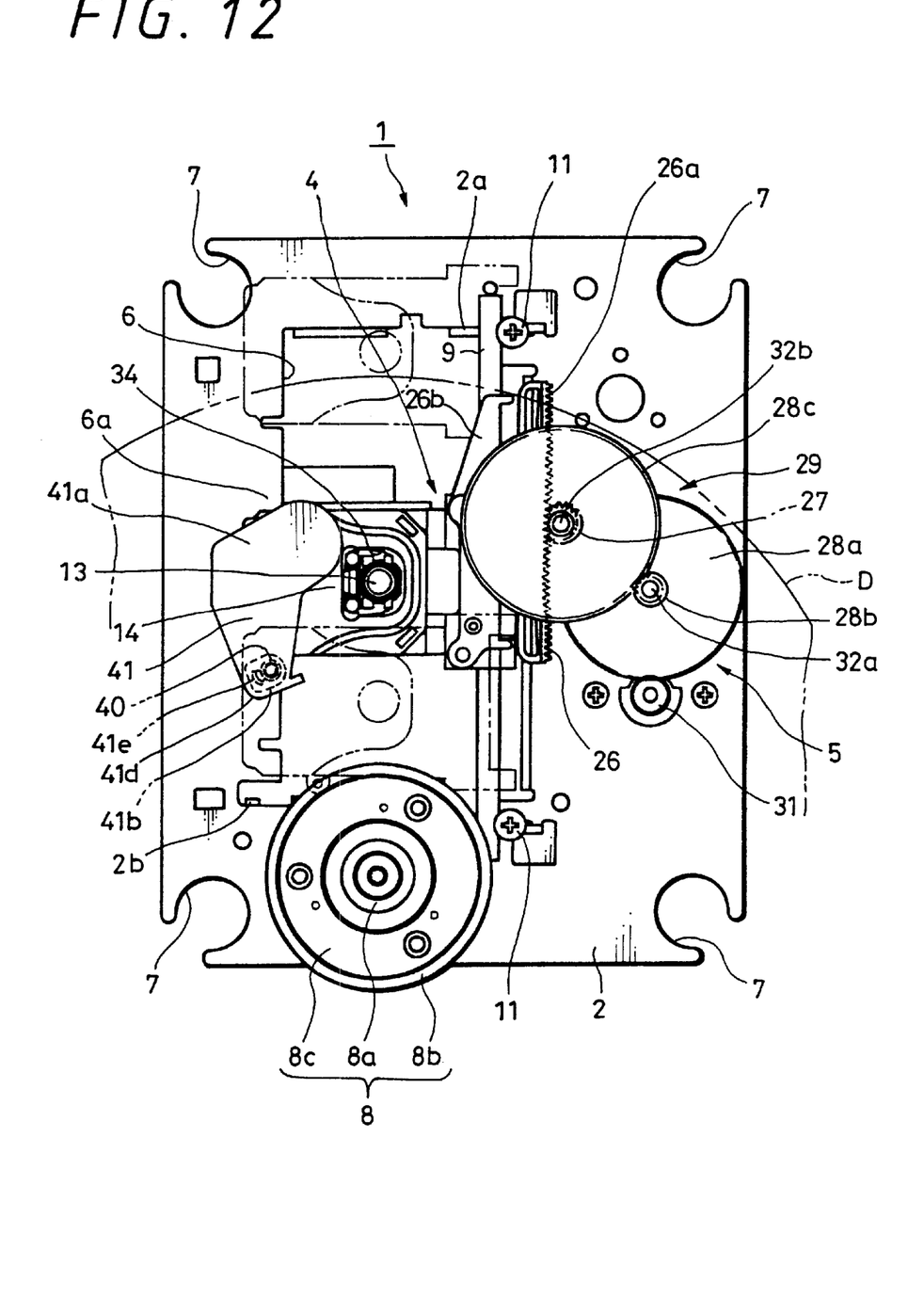
FIG. 12 shows an optical disk apparatus according to a second embodiment of the present invention, and is a top plan view showing a state that a shutter is opened so as to expose a cover through-hole.
Figure 13:
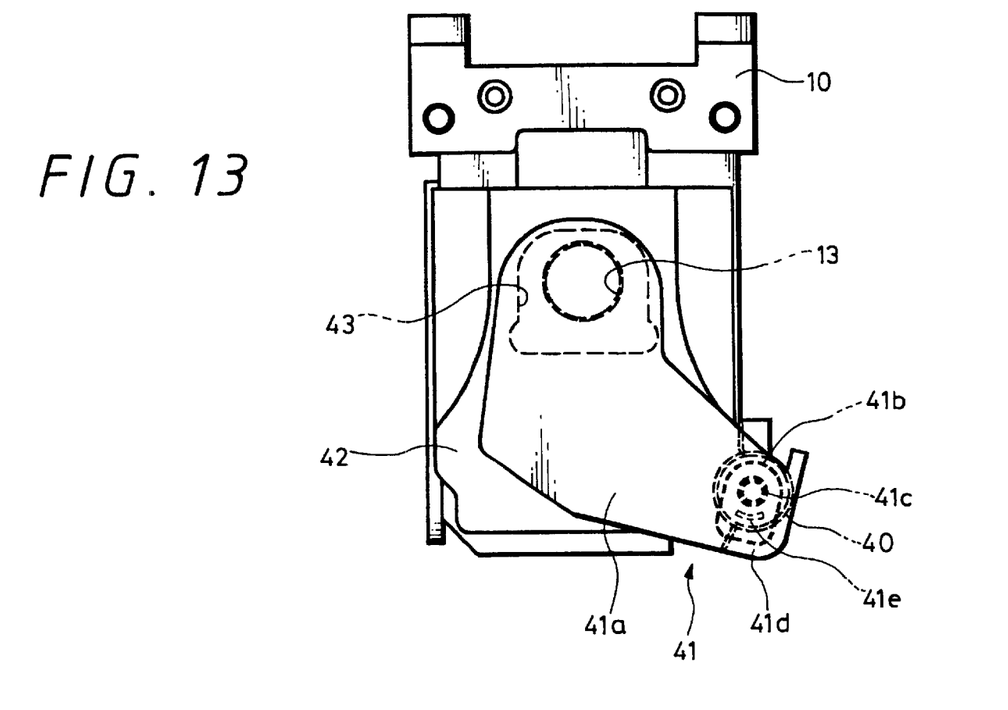
FIG. 13 shows principal parts of the optical disk apparatus according to the second embodiment of the present invention, and is a top plan view showing a state that the cover through-hole is closed by the shutter.
Figure 14:
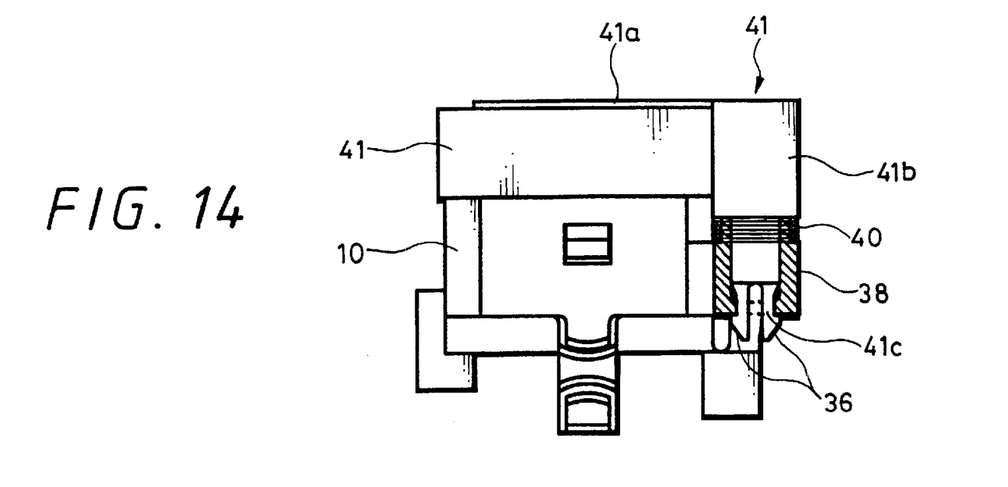
FIG. 14 shows principal parts of the optical disk apparatus according to the second embodiment of the present invention, and is a front view showing a state that the cover through-hole is closed by the shutter.

Moreover, FIG. 12 to FIG. 14 show principal parts of an optical disk apparatus according to a second embodiment of the present invention. FIG. 12 is a top plan view showing a state that a shutter is opened so as to expose a cover through-hole, FIG. 13 is a top plan view showing principal parts in a state that the shutter is closed, and FIG. 14 is a front view showing principal parts in a state that the shutter is closed.

At first, an optical disk D will be described below. The optical disk D is composed of a disk substrate made of a transparent plastic material such as polycarbonate, a signal recording layer formed on one surface of the disk substrate, and a protection layer formed on the other surface of the disk substrate opposite to the signal recording layer. In the optical disk D, a boundary surface (interface) between the disk substrate and the signal recording layer is used. as a signal recording surface. On the signal recording surface there is formed a coaxial spiral recording track, and an information signal by pit is recorded along the recording track.

The optical disk D has a diameter, which is set to, e.g., about 120 mm, 80 mm or 64 mm, and is formed with a chucking circular center hole at the central portion thereof. A predetermined radius position on an inner circumferential side near to the center hole is set as a read-in section (read start position)and, a predetermined radius position on an outer circumferential side near to an outer circumferential edge is set as a read-out section (read end position). A portion from the read-in section to the read-out section is set as a signal recording area.

Next, a disk reproducing apparatus will be described below. A disk regenerator 1 includes a chassis 2 having a substantially rectangular frame body; a spindle motor 3 which is mounted on the chassis 2 and functions as a mechanism for rotatably driving a disk; an optical pickup apparatus 4 which is movably supported on the chassis 2, a pickup feeder mechanism 5 which reciprocates the optical pickup apparatus 4 so that the pickup apparatus 4 is made to be closed to and apart from relative to the spindle motor 3.

The chassis 2 comprises a plate-like frame member which is formed with an opening window 6 at the substantially central portion thereof. It is preferable to use a metal plate such as a steel plate, a stainless steel plate and the like as a material of the chassis 2, but other materials such as an engineering plastic or the like may be used. Each of four corners of the chassis 2 is formed with an insulator attaching hole 7 to which a mount insulator (not shown) is mounted. The chassis 2 is elastically supported to a movable frame (not shown) via mount insulators attached to these insulator attaching holes 7, and is supported so as to be vertically movable with respect to an external housing case (not shown).

The spindle motor 3 fixed to the chassis 2 is arranged on one side of the frame body of the chassis 2 in a longitudinal direction thereof, and as shown in FIG. 2, is fastened and fixed onto the lower surface of the chassis 2 by means of a plurality of (mounting) screws. A rotary shaft 3a of the spindle motor 3 penetrates through the chassis 2, and is upwardly projected. An upper end portion of the rotary shaft 3a is attached integrally with a turn table 8.

The turn table 8 includes a disk fitting portion 8a which is fitted into a center hole opened at the central portion of the optical disk D such as a CD (Compact Disk), a CD-ROM (Read Only Memory) or the like; and a disk mounting or placing portion 8b for supporting a circumferential edge of the center hole of the optical disk D. Moreover, an iron plate 8c, which is a magnetic material, is fixed to the disk placing portion 8b of the turn table 8, and a magnet built in a chucking plate (not shown) is attracted by the iron plate 8c. Based on the attraction force of the magnet, the optical disk D is sandwiched and held between the disk placing portion 8b and the chucking plate, and thereby, the optical disk D is sandwiched and chucked to the turn table 8 so as to be rotatably driven integrally with the turn table 8.

The optical pickup apparatus 4 is constructed so as to be closed to and apart from the turn table 8. Further, the optical pickup apparatus 4 irradiates a laser light or beam on the signal recording surface of the optical disk D, and then, receives a laser light or beam reflected by the signal recording surface and returned so as to reproduce an information signal recorded on the signal recording surface.

The optical pickup apparatus 4 is slidably supported to a guide shaft 9 which is located in the vicinity of one side on a longer side of the opening window 6, and to the other side 6a on the longer side of the opening window 6, and thus, is movable to the longer side of the opening window 6. The guide shaft 9 is arranged so as to ride on the opening window 6 in the longitudinal direction, and is fixed to the chassis 2 in a manner that longitudinal both end portions of the guide shaft 9 are held between a projected portion 2a of the chassis 2 and a fixing screw 11. Further, the guide shaft 9 extends through a longitudinal one side of a slide base 10 of the optical pickup apparatus 4 so as to be slidable in a crosswise direction. The longitudinal other side of the slide base 10 is engaged with one side 6a on the longer side of the chassis 2. Whereby the slide base 10 is guided by the guide shaft 9 and the one side 6a on the longer side of the chassis 2 so as to be linearly movable.

The slide base 10 is mounted with an optical unit 12 having an objective lens 13 facing the signal recording surface of the optical disk D loaded on the turn table 8, and a biaxial actuator (objective lens driving unit) 14 for following a laser beam emitted from the objective lens 13 to a recording track of the optical disk D. As shown in FIG. 11, in addition to the objective lens 13, the optical unit 12 includes a semiconductor laser 15 which emits a laser light or beam and is used as a light source, a diffraction grating 16, a semi-transmission mirror (beam splitter plate) 17, and a photo-detector 18 comprising a photodiode and so on. These optical components are arranged in a housing 19 having a predetermined optical path 19a so as to h have a pre determined positional relationship, so that the laser beam is freely passed therethrough.

The laser beam emitted from the semiconductor laser 15 is passed through the diffraction grating 16, and then, is reflected by the semi-transmission mirror 17 so as to be bent at an angle of 90°, and thus, is incident upon the objective lens 13 held by a lens holder 20. The laser beam incident upon the objective lens 13 is irradiated on a disk substrate side of the optical disk D, and then, is transmitted through the disk substrate, and thus, is converged onto a signal recording surface d. The laser beam converged onto the signal recording surface d of the optical disk D is reflected in a manner that its strength is modulated in accordance with an information signal recorded on the signal recording surface d. The laser beam reflected on the signal recording surface d is transmitted through the objective lens 13 and the semi-transmission mirror 17, and then, is converged onto a light receiving surface of the photo-detector 18.

When the return laser beam is transmitted through the semi-transmission mirror 17 which is arranged in a state of being inclined at an angle of 45° to an optical axis thereof, an astigmatism takes place, and thus, each luminous flux is received by means of the photo-detector 18. The photo-detector 18 has a plurality of divided light receiving surfaces, and outputs an optical detection signal of a level corresponding to a quantity of light received independently for each surface. By carrying out an operation of a plurality of optical detection signals outputted from the photo-detector 18, it is possible to obtain a reproduction signal (RF signal) of an information read from the optical disk D, a focus error signal and a tracking error signal.

Based on the reproduction signal, an operation for reproducing the information recorded in the optical disk D is carried out. The focus error signal is a signal obtained by an astigmatism method, for example; more specifically, a signal which is indicative of a distance in an optical axis direction of the objective lens 13 between a convergent point of the laser beam by the objective lens 13 and the signal recording surface d of the optical disk D. The tracking error signal is a signal obtained by a three-beam method, for example, more specifically, a signal which is indicative of a position with respect to a track in a radius direction of the optical disk D (direction perpendicular to the optical axis of the objective lens 13) between a convergent point of the laser beam by the objective lens 13 and the signal recording surface d of the optical disk D.

The biaxial actuator 14, which makes the convergent point of laser beam by the objective lens 13 of the optical unit 12 follow up the signal recording surface of the optical disk D, is such a biaxial actuator 14 which can move the objective lens 13 independently in a focus direction (optical axis direction of the objective lens 13) and a tracking direction (direction perpendicular to an optical axis of the objective lens 13), and uses an electromagnetic force exclusively as a driving force thereof. As the biaxial actuator 14, the following systems can be properly used. More specifically, the system includes a leaf (plate) spring system such that a leaf spring is used as a supporting mechanism, and a movable part having the objective lens and a driving coil is movable independently in a vertical direction and in a horizontal direction; a shaft sliding system such that a shaft and a movable part attached to a fixing section is slidable so as to have a degree of freedom in a vertical direction, and the movable part is rotated around the shaft so as to move the objective lens in a horizontal direction; a wire support system such that in place of the leaf spring, four wires having an elasticity constitute a link mechanism so as to support a movable part; a hinge system such that a hinge link mechanism and a rotating part are formed of a resin having an elasticity, and so on.

The optical pickup apparatus 4 is composed of the aforesaid biaxial actuator 14 and the optical unit 12. The pickup apparatus 4 is connected with a flexible wiring board 22, as shown in FIG. 3, and a printed wiring board 23 on one end of the flexible wiring board 22 is provided with a connective section 24. The connective section 24 is connected with a connective section of a main printed wiring board mounted to a machine main body (not shown). The optical pickup apparatus 4 is electrically connected to a domestic power source or a portable power source such as a dry cell or the like via the printed wiring board 23.

As shown in FIG. 1 and FIG. 2, the slide base 10 is attached with a rack 26 which constitutes one of a rack and a pinion gear. The rack 26 has a rack main body 26a which comprises a linear rod material formed with many teeth in one line, and a base portion 26b which projects to a direction opposite to these teeth on the midway portion in a longitudinal direction of the rack main body 26a. The base portion 26b is fixed by a fixture means such as a screw or the like, and thereby, the rack 26 is constructed integrally with the slide base 10. The pickup feeder mechanism 5 for driving the optical pickup apparatus 4 is located on the chassis 2 via the rack 26.

The pickup feeder mechanism 5 is composed of a reduction gear train 29 having an output gear 27 engaging with the rack 26 and three intermediate gears 28a to 28c, a driving motor 30 used as a power source, and a driving gear 31. The driving motor 30 is attached onto a lower surface of the chassis 2 by means of a fixture screw in a manner that its rotary shaft is upwardly projected, similar to the spindle motor 3. The rotary shaft of the driving motor 30 is attached integrally with the driving gear 31 which is engaged with the first intermediate gear 28a. The first intermediate gear 28a is provided integrally with the second intermediate gear 28b which is engaged with the third intermediate gear 28c. The third intermediate gear 28c is provided integrally with the output gear 27. The output gear 27 and the third intermediate gear 28c and the first and second intermediate gears 28a and 28b are rotatably supported to supporting shafts 32a and 32b planted on the chassis 2, respectively.

Moreover, the aforesaid biaxial actuator 14 is attached with a dustproof cover 33 for preventing a dust from adhering to the objective lens 13 and the movable. The dustproof cover 33 is made of a material such as an engineering plastic or the like, and is formed into a substantially rectangular case having an opening at a lower side thereof. The dustproof cover 33 is provided with a plurality of pawl portions at the lower edge thereof. These pawl portions are engaged with a yoke base which constitutes one part of the biaxial actuator 14 or the like so that the dustproof cover 33 is mounted to the housing 19 side of the optical unit 12. Further, an upper surface of the dustproof cover 33 is formed with a window opening 34 properly larger than the objective lens 13 at a position corresponding to the objective lens 13. The window opening 34 is formed so as to cover a range where the objective lens 13 is moved by means of the biaxial actuator 14, and hence it does not obstruct the irradiation of the laser beam.

The window opening 34 of the dustproof cover 33 is constructed so as to be opened and closed by means of a shutter 35. The shutter 35 has a construction as shown in FIG. 9A to FIG. 9D and FIG. 10A to FIG. 10D. More specifically, the shutter 35 is composed of a shutter member 35a having a size and a shape capable of fully closing the window opening 34; an arm member 35b formed on one side of the shutter member 35a; a rotary shaft body 35c formed on one side of the arm member 35b; a come-off preventive portion 35d formed on one side in an axial direction of the rotary shaft body 35c; a spring supporting member 35e formed on a base portion of the come-off preventive portion 35d; and a trigger member 35f which functions as a trigger section for rotatably operating the shutter 35.

The shutter member 35a; of the shutter 35 has a shape such that one corner portion of a shielding portion having a substantially rectangular shape is obliquely cut off, and the arm member 35a is formed so as to be situated down at one side of the cut-off portion. The rotary shaft body 35c side of the arm member 35a has a wide width so as to have a sufficient strength. The rotary shaft body 35c comprises a bottomed cylinder having an opening at the upper surface thereof, and is provided with the come-off preventive portion 35d projecting downwardly from the lower surface of the rotary shaft body 35d. The come-off preventive portion 35d is formed with a slit-like notch at the central portion, so that an elasticity is given to facing two members. Further, a tip end of the come-off preventive portion 35d is provided with a pawl portion 36, so that it is possible to prevent the shutter 35 from coming off from a bearing hole (described later) which is formed in the slide base 10.

The spring supporting member 35e of the shutter 35 is formed so as to be projected toward a direction reverse to the arm member 35a at the lower end portion of the rotary shaft body 35c. Further, the spring supporting member 35e is formed with a through hole at the tip end thereof. As shown in FIG. 4 or the like, one end of an extension coil spring 37 which is one embodiment of an elastic element, is hooked onto the through hole of the spring supporting member 35e. As shown in FIG. 10, the trigger member 35f of the shutter 35 is arranged on one side of the slit side of the come-off preventive portion 35d with a proper clearance. When the trigger member 35f is abutted against a stopper member 2b provided on the chassis 2 as shown in FIG. 5, the shutter 35 is controlled so as to be rotatable.

In order to rotatably support the shutter 35 having the construction as described above, the slide base 10 is provided with a bearing portion 38 having a bearing hole 38a. The bearing portion 38 is arranged on the spindle motor 3 side of the slide base 10. A side portion of the slide base 10 is provided with a spring supporting member 10a, to which the other end of the extension coil spring 37 is hooked, at a position slightly apart from the bearing portion 38 in a widthwise direction of the chassis 2.

By the spring force of extension coil spring 37 stretched between the spring supporting member 10a and the spring supporting member 35e of the shutter 35, the shutter 35 is movable so as to open the window opening 34 of the dustproof cover 33 as shown in FIG. 1 and FIG. 7 in a free state. When the slide base 10 is moved to the spindle motor 3 side, and then, the stopper member 2b of the chassis 2 is abutted against the trigger member 35f of the shutter 35 so as to rotate the shutter 35 against the spring force of the extension coil spring 37, the shutter member 35a; is moved so that the window opening 34 is opened.

The disk reproducing apparatus 1 having the construction as described above is elastically supported to a movable frame which is supported to an external housing case (not shown) so as to be vertically rotatable, via the mount insulator mounted to the insulator mounting hole 7. When the movable frame is downwardly rotated, the movable frame is sunk under a disk tray. Under this state, the optical disk D on the turn table 8 is placed on the disk tray, whereby the disk tray can be pulled out. When it pulled out, the optical disk D can be taken out and exchanged.

Moreover, when the movable frame is upwardly rotated, and the turn table 8 is upwardly projected from the disk tray, the optical disk D placed on the disk tray can be transferred and placed on the turn table 8. Then, when the optical disk D is chucked between the chucking plate and the turn table 8, the turn table 8 is rotated so as to rotate the optical disk D at a predetermined speed.

In the aforesaid disk regenerator 1, when, as shown in FIG. 1, the optical pickup apparatus 4 is moved to a direction approaching the spindle motor 3 (direction shown by an arrow A in FIG. 1) via the pickup feeder mechanism 5 such that the optical pickup apparatus 4 comes into a slightly inner side from the read-in section on the inner circumferential side of the optical disk D, the shutter 35 is rotated in a close direction, and then, the window opening 34 of the dustproof cover 33 is closed by means of the shutter member 35a. More specifically, when the slide base 10 of the optical pickup apparatus 4 approaches the spindle motor 3 by a predetermined position, the trigger member 35f of the shutter 35 is abutted against the stopper member 2b of the chassis 2. Further, when the slide base 10 approaches the spindle motor 3, the shutter 35 is rotated in a counterclockwise direction in FIG. 1 against the spring force of the extension coil spring 37. As a result, the shutter member 35a; is transferred from the state as shown in FIG. 7 to the state as shown in FIG. 4, and thus, the window opening 34 is closed (covered with) by means of the shutter member 35a.

As a result, before the read start, the objective lens 13 facing the inner side of the window opening 34 is fully closed by means of the shutter member 35a; of the shutter 35, and therefore, it is possible to prevent a dust or the like from adhering to an laser beam emission surface of the objective lens 13, and to prevent an adhesion of dirt, breakdown or the like. Likewise, it is possible to prevent a dust or the like from adhering to the supporting mechanism such as a wire of the biaxial actuator 14 or the like, whereby a response property of the biaxial actuator 14 can be secured, and a preferable reproducing operation can be realized for a long time.

On the other hand, when the optical pickup apparatus 4 is moved in a direction apart from the spindle motor 3, the shutter 35 is rotated by the spring force of the extension coil spring 37 in a clockwise direction in FIG. 4, as being apart from the stopper member 2b. As a result, the shutter member 35a; is changed from the state as shown in FIG. 4 to the state as shown in FIG. 7, and thus, the window opening 34 closed by the shutter member 35a; so far is opened. An opened state of the window opening 34 is also secured even in the case where the optical pickup apparatus 4 is moved to the outside slightly from the read-out section on the outer circumferential side of the optical disk D. Therefore, the window opening 34 is opened over the entire signal recording area from the read-in section of the optical disk D to the read-out section thereof, so that an information signal can be securely read by means of the optical pickup apparatus 4, and the information can be positively reproduced.

FIG. 12 to FIG. 14 show a second embodiment of the present invention. In this second embodiment, a torsion spring 40 is used as an elastic body in place of the aforesaid extension coil spring 37. A shutter 41 of the second embodiment is composed of a shutter member 41a having a size and a shape capable of fully closing a window opening 43 of a dustproof cover 42; a rotary shaft body 41b formed on one side of the shutter member 41a; a come-off preventive portion 41c formed on one side in an axial direction of the rotary shaft body 41b; a spring supporting member 41d formed on a base portion of the come-off preventive portion 41c; and a trigger member 41e which functions as a trigger section for rotatably operating the shutter 41.

The shutter member 41a of the shutter 41 has a substantially V-letter shape, and is formed with the rotary shaft body 41b which is downwardly projected, at one side in the longitudinal direction thereof. The spring supporting member 41d of the shutter 41 is downwardly projected so as to be engaged with one end of the torsion spring 40. The come-off preventive portion 41c and the trigger member 41e have the same construction as the aforesaid first embodiment. The bearing portion 38 of the slide base 10 for rotatably supporting the rotary shaft body 41b of the shutter 41 is formed with a small-diameter portion for loosely fitting the torsion spring 40 therein, and one end of the torsion spring 40 is hooked onto the bearing portion 38. The chassis 2 is provided with a stopper member 2b for operating (controlling) the trigger member 41e, at a position corresponding to the trigger member 41e. Other construction of the second embodiment is the same as the aforesaid first embodiment.

Thus, it is possible to obtain the same effect as the aforesaid first embodiment by the shutter 41 having the construction as described above. In particular, according to this second embodiment, the shutter 41 is opened and closed by a spring force of the torsion spring 40, so that there is no need of providing the spring supporting members 10a and 35e as described in the first embodiment. Therefore, it is possible to make a space for mounting the elastic body smaller.

In addition, it is preferable to use, for example, an engineering plastic as the material for the aforesaid dustproof cover 33, 42 and shutter 35, 41. A stainless steel plate and other metal plates may be used as the material.

Thus, the present invention is not limited to the above embodiments. For example, in the above embodiments, the optical disk reproducing apparatus and the optical pickup apparatus used in the disk reproducing apparatus have described with the use of an optical disk for reproduction only. A magnet-optical disk and other optical disks may be applicable as the optical disk. Moreover, the present invention is of course applicable to a recording only disk reproduction apparatus and its optical pickup apparatus, or to a recording/reproducing disk reproducing apparatus and its optical pickup apparatus. In addition, a construction of the optical system is not limited to the above embodiments, and optical systems having various constructions may be employed.

In the above embodiment, the shutters 35, 41 have been constructed so as to be rotatable. It is a matter of course that their shutters 35, 41 may be constructed so as to be slidable. Moreover, of course, the slide base may be provided with the supporting shaft, and also, the shutter may be provided with the bearing portion. In addition, the method for chucking the optical disk is not limited to the above embodiments. For example, the turn table is provided with a pawl portion, and the optical disk may be chucked by only the turn table. The above embodiment have described the example in which the window openings 34, 43 are closed by the shutters 35, 41 at the inner circumferential side of the optical disk D. The window openings 34, 43 may be closed by the shutters 35, 41 at an outer circumferential side of the optical disk D. Further, the window openings 34, 43 are closed by the shutters 35, 41 at both inner and outer circumferential sides of the optical disk D. As described above, in the present invention, various modifications may be made within a scope without departing from the gist of claims.

As is evident from the above description, in the optical head apparatus of the present invention, the shutter is attached to the slide base so as to be movable. Therefore, according to the present invention, the following effect can be obtained; more specifically, it is possible to securely support the shutter, and to protect the objective lens from dust or the like by covering the light emission surface of the objective lens with the shutter.

Moreover, the optical disk apparatus of the present invention includes the spindle motor, the slide base, the biaxial actuator, the shutter and the chassis. Therefore, according to the present invention, the following effect can be obtained; more specifically, it is possible to securely support the shutter, and to protect the objective lens from dust or the like by covering the light emission surface of the objective lens with the shutter.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical head apparatus comprising:
   a biaxial actuator having an objective lens opposing an information recording surface of an optical disk;
   a slide base having the biaxial actuator mounted thereon and being movable in a radius direction of the optical disk;
   a shutter movably provided on the slide base and having a trigger portion for cooperation with an operating member to move the shutter between a lens opening position and a lens closing position, wherein
   one of the shutter and the slide base has a rotary shaft, and an other of the shutter and the slide base has a bearing portion for rotably supporting the rotary shaft, whereby the shutter is rotatable and is directly supported by the slide base; and
   a torsion spring containing a coil portion concentrically supported by the rotary shaft and having a pair of end portions, one of the pair of end portions: being hooked on the bearing portion and an other of the pair of end portions being hooked on the shutter for urging the shutter to the lens closing position.

2. The optical head apparatus according to claim 1, further comprising a cover which covers the biaxial actuator and includes a through-hole through which a laser beam emitted from the objective lens is transmitted, wherein the through-hole of the cover is opened and closed by the shutter.

3. The optical head apparatus according to claim 1, wherein the rotary shaft includes a come-off preventive portion having an elasticity and which is abutted against and fitted into a bearing hole of the bearing portion.

4. The optical head apparatus according to claim 1, wherein the rotary shaft includes said torsion spring engaged therewith for urging the shutter by a spring force of the torsion spring.

5. An optical disk apparatus comprising:
   a spindle motor for chucking and rotating an optical disk;
   a slide base supported so as to be movable in a radius direction of the optical disk chucked by the spindle motor;
   a biaxial actuator mounted on the slide base and having an objective lens opposed to an information recording surface of an optical disk;
   a shutter for opening and closing an emission surface of a laser beam transmitted through the objective lens;
   a chassis for movably supporting the slide base, wherein the shutter is movably attached to the slide base and includes a shutter opening and closing means having a trigger portion cooperating with an operating member for moving the shutter between a closed position of covering the emission surface of a laser beam transmitted through the objective lens and an open position of exposing the emission surface, wherein
   the shutter includes a rotary shaft, and the slide base includes a bearing portion for rotatably supporting the rotary shaft, whereby the shutter is rotatable and is directly supported by the slide base; and
   a torsion spring containing a coil portion concentrically supported by the rotary shaft and having a pair of end portions, one of the end portions being hooked on the bearing portion and an other of the end portions being hooked on the shutter for urging the shutter to the closed position.

6. The optical disk apparatus according the claim 5, including a cover which covers the biaxial actuator and has a through-hole through which a laser beam emitted from the objective lens is transmitted, wherein the through-hole of the cover is opened and closed by the shutter.

7. The optical disk apparatus according to claim 5, wherein the rotary shaft includes a come-off preventive portion having an elasticity and which is abutted against and fitted into a bearing hole of the bearing portion.

8. The optical disk apparatus according to claim 5, wherein the shutter opening and closing means operates the shutter to close the emission surface of the objective lens when the slide base moves to an inner circumferential end in a radius direction of the optical disk.

9. The optical disk apparatus according to claim 5, wherein the shutter opening and closing means operates the shutter to open the emission surface of the objectives lens when the slide base moves to an outer circumferential end in a radius direction of the optical disk.

* * * * *